United States Patent [19]

Jones et al.

[11] Patent Number: 5,132,142
[45] Date of Patent: Jul. 21, 1992

[54] APPARATUS AND METHOD FOR PRODUCING PELLETS BY LAYERING POWER ONTO PARTICLES

[75] Inventors: David M. Jones, Ramsey, N.J.; Peter F. F. Hirschfeld, Freiburg; Reinhard Nowak, Binzen, both of Fed. Rep. of Germany

[73] Assignee: Glatt GmbH, Binzen, Fed. Rep. of Germany

[21] Appl. No.: 672,533

[22] Filed: Mar. 19, 1991

[51] Int. Cl.⁵ ............................................. B05D 1/34
[52] U.S. Cl. ...................................... 427/196; 118/24; 118/303; 118/308; 118/320; 427/3; 427/203; 427/212
[58] Field of Search ................. 118/24, 303, 308, 320, 118/DIG. 5; 427/185, 196, 202, 203, 212, 213, 3

[56] References Cited

U.S. PATENT DOCUMENTS

| | | | |
|---|---|---|---|
| 3,671,296 | 6/1972 | Funakoshi et al. | 427/212 |
| 3,687,717 | 8/1972 | Philip | 427/213 |
| 4,034,126 | 7/1977 | Funakoshi | 427/212 |
| 4,323,312 | 4/1982 | Glatt et al. | 34/10 |
| 4,542,043 | 9/1985 | Abe et al. | 118/303 |
| 4,724,794 | 2/1988 | Itoh | 118/303 |
| 4,895,733 | 1/1990 | Imanidis et al. | 427/213 |
| 5,011,640 | 4/1991 | Zanchetta | 427/212 |

Primary Examiner—Shrive Beck
Assistant Examiner—Terry J. Owens
Attorney, Agent, or Firm—Fleit, Jacobson, Cohn, Price, Holman & Stern

[57] ABSTRACT

An apparatus for layering powder onto particles has a vessel in which a rotor is mounted rotatable therein around a vertical axis. The rotor is a disc with a supporting surface for supporting particles. The apparatus also has a feeder with a substantially horizontal introducing member protruding slightly into the vessel above the disc. The introducing member limits a liquid outlet and an annular powder outlet encompassing the liquid outlet. During a layering operation, the introducing member protrudes into a bed of particles lying on the rotating disc and moved by the latter. There can then be sprayed liquid and powder simultaneously onto the particles passing in proximity of the outlets. This enables layering powder onto particles to produce thereby pellets having sizes lying in a narrow range.

18 Claims, 3 Drawing Sheets

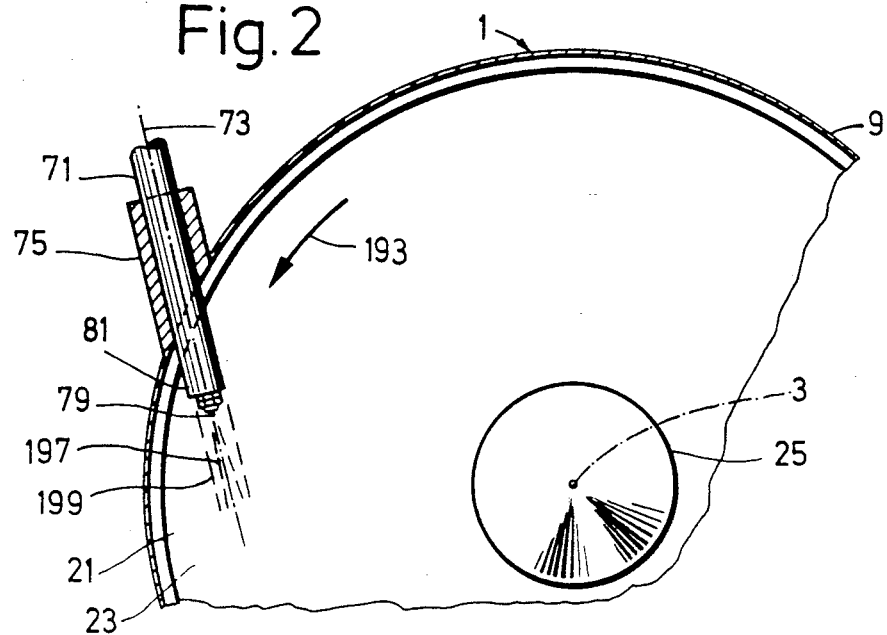
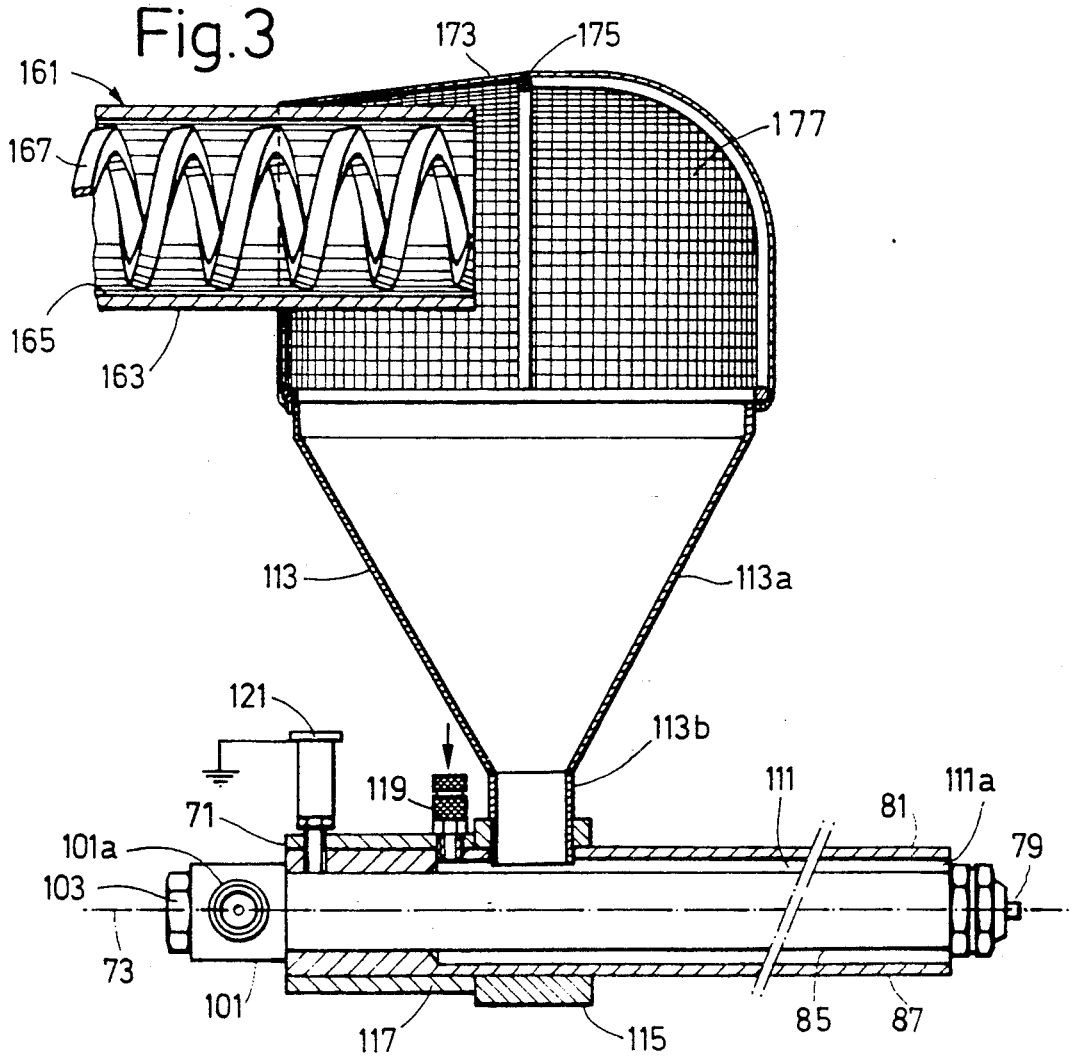

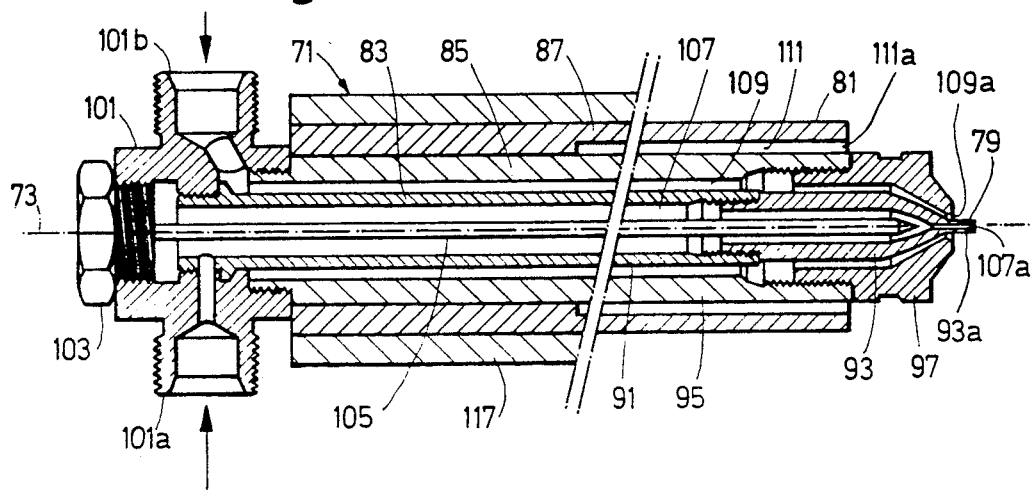

APPARATUS AND METHOD FOR PRODUCING PELLETS BY LAYERING POWER ONTO PARTICLES

BACKGROUND OF THE INVENTION

1. Technical Field of the Invention

The present invention relates to an apparatus and to a method for producing pellets by layering powder onto particles.

The apparatus comprises a vessel and a rotor having a supporting surface on its upper side for supporting particles. The rotor is arranged in said vessel and supported for rotation around a vertical rotational axis. The vessel contains a processing space adjacent to the upper side of said rotor and, thus, to said supporting surface. The apparatus comprises furthermore feeding means for introducing a powder and a liquid into said processing space.

For producing pellets, particles serving to constitute the cores of the pellets to be produced are introduced into the processing space. These particles are designated in the following also as core particles. The rotor is then rotated so that a bed of moving particles is formed on the supporting surface of the rotor. Moreover, a gas—normally air—may be conveyed in an upward direction through an annular gap between a wall portion of the vessel and the rotor. In a layering operation, liquid and powder are introduced into the processing space, atomized and sprayed onto the core particles. The liquid serves thereby to bind the fine powder particles onto the surfaces of the core particles and on powder already layered onto the core particles. The core particles that are originally nude—i.e. comprise no layer—are then provided with a growing powder layer. In this way, one can produce pellets with core particles coated with an envelope comprising powder, wherein the volume and mass and weight of this envelope may be larger, for instance up to five times or even more times larger than the volume and mass and weight, respectively, of the core particles brought originally into the processing space and forming the cores of the pellets.

The produced pellets may serve, for example, as particulate drugs or components of drugs, wherein the envelope formed by powder may comprise at least one pharmaceutical effective or active substance. The produced pellets, may, however, also serve for other purposes and form for instance nutrients, agricultural and other chemicals or seed pellets.

2. The State of the Art

U.S. Pat. No. 4,895,733 discloses apparatuses that comprise a vessel and a disc-type rotor arranged rotatably around a vertical axis in said vessel. A filter is disposed inside the vessel above the rotor. The portion of the interior of the vessel arranged between the rotor and the filter serves as processing space. The apparatuses comprise furthermore a sucking device for sucking air underneath the rotor into the vessel and in an upward direction through an annular gap between the wall of the vessel and the rotor, through the processing space and through the filter. The apparatus comprises moreover feeding means that comprise an introducing member with one or several mouths opening into the processing space for introducing a dry particulate material into the processing space. The feeding means comprise also a plurality of nozzles for introducing a liquid into the processing space.

The apparatuses disclosed in U.S. Pat. No. 4,895,733 are primarily designated to agglomerate particles and are suited well for this purpose. However, these apparatuses may also be used for coating first particles—i.e. core particles—for instance by layering second, smaller particles—i.e. powder—onto said core particles. For this purpose, a batch of core particles is introduced into the processing space and onto the rotor. While the particles are then alternately moved over the rotating rotor and whirled up by air streaming upward through the vessel, liquid is introduced into the portion of the processing space above the bed formed by the particles moving over the rotor. The powder formed by the second particles may be introduced into the processing space, for instance, in dry state continuously or intermittently during the moving of the core particles (see column 3, line 64 to column 4, line 6).

The movements of the nude core particles and of the core particles comprising already a powder layer caused by the rotation rotor and the air sucked through the vessel are rather complicated and in particular different for the individual particles. For this reason and because the powder and liquid are introduced into the processing space above said bed at places that are relatively far away from each other, powder may reach particles that are rather irregularly and differently wetted by the liquid. More specifically, the powder may come into contact in part with more or less dry particles and in part with very wet particles. However, the powder will not adhere to dry particles. Furthermore, particles that are very wet may tend to agglommerate. Thus, the product produced will likely comprise pellets with very different sizes and possibly even irregular forms. Pellets with irregular sizes and possibly irregular forms are, however, for many purposes and particularly for drugs very disadvantageous. The individual pellets comprise then namely different amounts of the pharmaceutical effective substance. When such pellets will be administered for instance orally to a person ar an animal, the different sizes will also result in different delivery rates of the effective substance. The fact that the particles coming into contact with powder are irregularly wet, results also in the disadvantage that a relatively large amount of liquid is needed for wetting the particles so that the time and energy for drying the particles will be relatively high. Furthermore, the air passed through the processing space may lift a considerable fraction of the supplied powder to the filter. As the powder may comprise at least one very expensive pharmaceutical substance, a loss of the powder carried to the filter might considerably increase the costs of the produced pellets. In practice, one may shake the filter for recuperating the powder hanging on the filter. However, it will render the production of pellets more difficult and influence the quality of the pellets unfavorably if very large amounts of powder must be shaken off the filter. Moreover, liquid may possibly be carried to the filter, too. Such liquid may possibly cause the powder hanging on the filter to agglomerate. An agglomeration of the powder carried to the filter may render it difficult or even impossible to reuse said powder and may also obstruct the filter.

There is also mentioned in the cited U.S. Pat. No. 4,895,733 to introduce powder suspended in a liquid that is sprayed into the processing space (see column 4, lines 6 to 11). Coating particles with a dispersion comprising a liquid and a suspended powder has, however, the disadvantage that the dispersion must have a very high content of liquid in relation to its powder content and that the drying of the coated particles requires then a lot of time.

SUMMARY OF THE INVENTION

The invention, therefore, has the object of providing a device which overcomes the disadvantages of the known devices and, in particular, makes it possible to layer powder in such a way onto core particles that all the obtained pellets have more or less the same sizes, i.e. sizes lying within narrow limits, wherein the layering of the powder onto the core particles shall require only a relatively little amount òf liquid and time and wherein as little powder as possible shall be carried away from the bed of particles by gas passed possibly through the vessel.

This object is met in accordance with one aspect of the invention by means of an apparatus for producing pellets by layering powder onto particles, comprising a vessel, a rotor having a supporting surface for supporting particles, arranged in said vessel and supported for rotation around a vertical rotational axis, feeding means for introducing a powder and a liquid into a processing space disposed inside said vessel and adjacent to said supporting surface of said rotor, wherein said feeding means comprise an introducing member, a liquid outlet and a powder outlet, wherein said outlets open into said processing space and have a common axis, and wherein one of said outlets encompasses the other of said outlets in a view parallel to said axis of said outlets.

In accordance with a further aspect of the invention, there is provided a method for producing pellets by layering powder onto particles, wherein particles are introduced into a processing space of vessel, the processing space being limited at its lower end by a rotor rotatable around a vertical axis, wherein in a layering operation the rotor is rotated so that a bed of moving particles is formed on the rotor, and wherein liquid and powder are introduced into said bed and atomized during said layering operation by feeding means having a liquid outlet and a powder outlet protruding into said bed.

The vessel comprises preferably a wall that has a conical inner surface tapering in a downward or possibly in an upward direction and forming a seat in the height region in which the rotor is arranged. The apparatus is preferably furthermore equipped with adjusting means enabling to adjust the height of the rotor. The latter can then be brought at levels where there remains a free annular gap with adjustable width between said seat and the rotor. The adjusting means can furthermore enable to bring and keep the rotor at a level where the periphery of the rotor contacts the seat and closes the part of the vessel forming the seat so tightly that no particles and no powder can fall downward between the seat and the rotor. The adjusting means may be formed for instance in a similar manner as it is disclosed for granulators in the U.S. Pat. No. 4,323,312 to which is made explicitly reference herewith.

The particles brought initially into the processing space and serving to form the cores of the pellets, i.e. the core particles, may comprise at least one inorganic and/or organic substance. The core particles may for instance consist of a pharmaceutical auxiliary substance suitable as carrier material such as sugar, salt, talc, starch, cellulose and the like. The core particles may consist of crystals with corners and cants. However, it is also possible to introduce core particles that were previously submitted to a shaping process—for instance granulated—and that are more or less precisely sphere-shaped and form, so-called "non-pareils". Moreover, the core particles might possibly comprise ceramic material or at least one seed grain.

The powder may comprise for instance a pharmaceutically effective substance or a blend of such substances and possibly a binding agent and/or at least one other pharmaceutical auxiliary substance. If the powder consists of a blend with two or more kinds of particles consisting of different substances, the various kinds of powder particles should be homogenously mixed.

The size or diameter of the core particles is normally at least 0.1 mm. The sizes of core particles designated for producing pharmaceutical pellets—i.e. drugs—may typically be at least 0.3 mm and for instance 0.4 mm to 0.6 mm or possibly up to 1 mm. The sizes of the powder particles should be substantially smaller than the sizes of the core particles. The sizes of powder particles used for producing drugs are preferably less than 0.05 mm and for instance about or at most 0.02 mm.

The liquid may consist at least to the largest part of water. The powder or at least one of its components and possibly also the core particles may be water soluble. In this case, the liquid may possibly consist of pure water. The powder particles can then be immobilized on the surfaces of the core particles and/or of powder particles already layered on core particles by water bridges. If the water solubility of the powder is not sufficient for binding the powder or if the powder is completely insoluble in water, the liquid may comprise—in addition to water—alcohol and/or another substance serving as binding agent. Suitable binding agents more or less well soluble in water are for instance polyvinylpyrrolidone, hydroxypropylmethylcellulose, maize starch and many others. If necessary, the liquid used for binding the powder may even comprise an organic solvent in place of water.

The invention enables to produce pellets that are rather precisely sphere-shaped and have rather uniform sizes, i.e. sizes lying in a narrow range. Accordingly, all pellets will then also comprise more or less the same amount of layered powder.

The invention enables to layer powder onto core particles by dispensing only a relatively small amount of liquid. If the layering takes place at normal room temperature—i.e. at about 20° C. to 25° C.—the ratio between the supplied amounts of liquid an powder may for instance lie in the range of 1:1 to 1.5:1. If the layering operation takes place at higher temperatures the mentioned ratio may also be increased as much as necessary for compensating the increased evaporation and may then be for instance up to 2.5:1. As said ratio can be made relatively small, the time needed for layering powder onto core particles and for subsequently drying the formed pellets is relatively short.

BRIEF DESCRIPTION OF THE DRAWINGS

The subject matter of the invention shall now be explained with reference to an embodiment example shown in the drawings. In the drawings there show.

PREFERRED EMBODIMENT OF THE INVENTION

Figure 1:
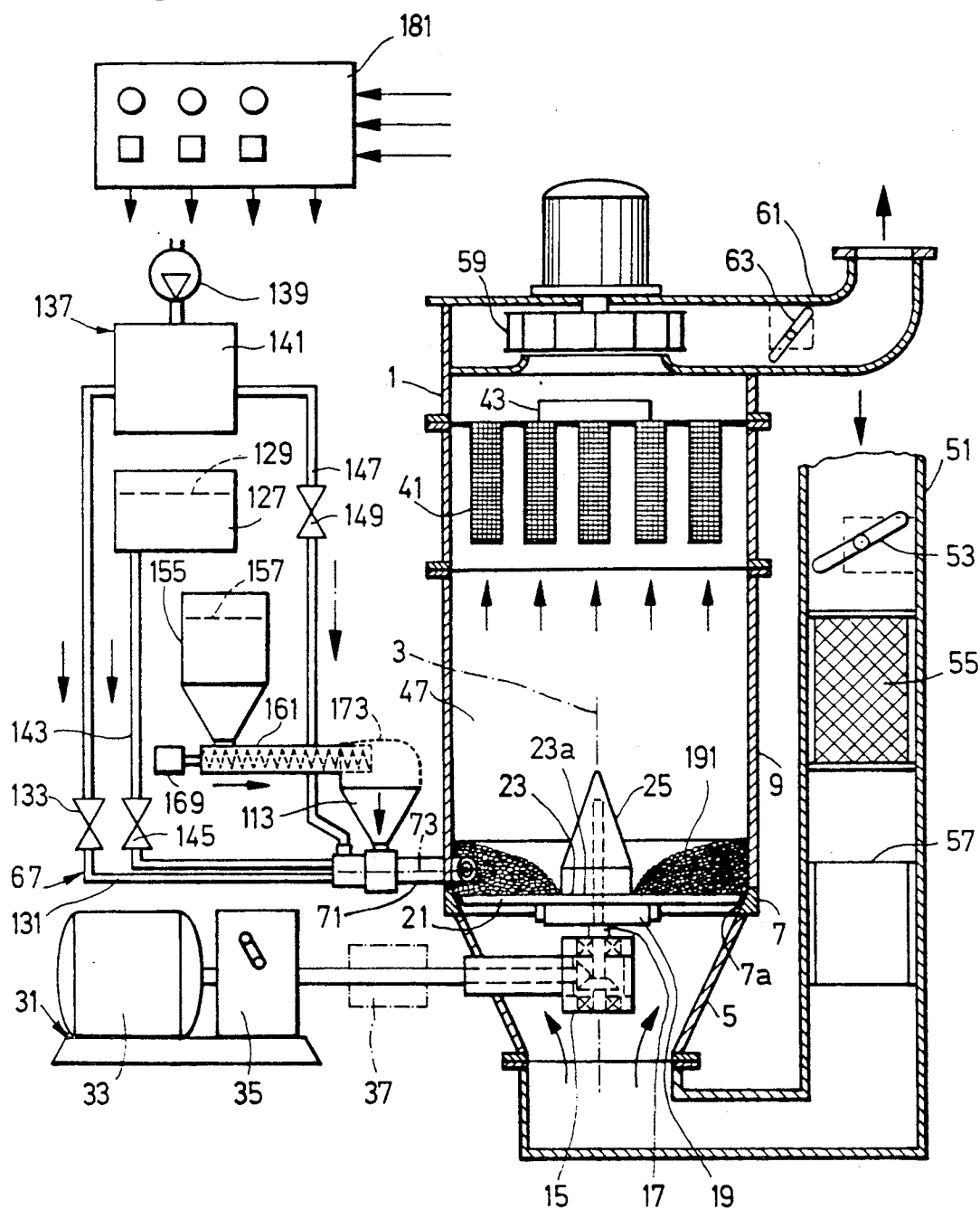
FIG. 1 a schematic vertical section through an apparatus for layering powder onto particles, FIG. 2 a simplified horizontal section through the vessel of the apparatus in the height of the introducing member of the apparatus in a larger scale than FIG. 1, FIG. 3 a vertical section along the axis of the introducing member and through a portion of the conveying device for conveying powder in a still larger scale than FIG. 2, wherein the inner nozzle is represented as projection, and FIG. 4 a horizontal axial section through portions of the introducing member in still a larger scale than FIG. 3.

The apparatus shown in FIG. 1 comprises a vessel 1 held on a support not shown in the drawing. The vessel has a vertical axis 3 and a wall that is in general rotationally symmetric to said axis 3. The wall comprises at the lower vessel end a conical wall part 5 widening upward and connected at its upper end with a wall part constituted by a flange ring 7 that possesses a conical inner surface widening upward and serving as a seat 7a. The wall part 9 disposed above the flange ring 7 comprises several detachably connected sections and is at least in part cylindrical.

A bearing and transmission unit 15 is accommodated inside the conical wall part 5 and comprises a housing fixedly mounted to the conical wall part 15 by way of arms. The unit 15 supports a shaft 17 rotatably around the axis 3. A rotor 21 is arranged on the shaft 17, connected to the latter by a slipping clutch and displaceable along the shaft 17 by means of an adjusting device 19 that may be manually actuated from the outside of the vessel. Accordingly, the rotor is rotatable around a rotational axis that coincides with the axis 3 of the vessel.

The rotor 21 comprises a circular disc 23 and a cap 25 arranged on a central portion of the upper side of the disc. The portion of the upper side of the disc 23 encircling the cap 25 is at least in general and preferably exactly and completely plane and horizontal and forms a supporting surface 23a. The edge surface of the disc 23 is conically widening upward with the same angle as the surface of the flange ring forming the seat 7a. The disc 23 is disposed about at the height of the flange ring 7 and can be displaced by means of the adjusting device 19 in various heights in which an annular gap arises between the flange ring 7 and the disc 23, wherein the radial width of the gap can be varied by varying the height of the disc 23. The disc 23 can also be brought in a lower end position in which the disc rests more or less tightly on the seat 7a. The cap 25 is at least in part conical and tapering upward. The rotor 21 is in rotational operative connection, by means of a level gear train disposed in the housing of the bearing and transmission unit 15, with a drive device 31 disposed outside the vessel 1. The drive device 31 comprises an electric motor 33, a transmission unit 35 with means for the stepless adjustment of the gear ratio and possibly a torque measuring device 37 represented by dash-dotted lines. There is remarked here that more information on possibly executions and details of the bearing and transmission unit 15, of the adjusting device 19, the rotor 21 and the drive device 31 may be found in the U.S. Pat. Nos. 4,323,312 and 4,895,733 cited already previously.

A filter 41 is disposed inside the vessel 1 above the rotor 21. There is also provided a vibrator 43 adapted for vibrating the filter 41. The portion of the free interior of the vessel 1 disposed above the rotor 21 and limited at the upper side by the filter 41 constitutes a processing space 47 gas-tightly limited against the surroundings.

Gas conducting and conveying means comprise a gas supply conduit 51 that is provided with a flow regulating member 53, a filter 55 as well as a heating device 57 and that is connected with an opening of the vessel 1 provided at the lower end of the conical wall part 5. The gas conducting and conveying means comprise moreover a sucking device 59 with an electric motor and with a turbine disposed at the upper end of the vessel 1. The sucking device 59 is connected with a gas exhaust conduit 61 that may be provided with a flow regulating member 63. Each flow regulating member 53, 63 comprises a flap that may be actuated for instance manually or by an actuator alternatively, wherein the actuator may be operated electrically or pneumatically or hydraulically.

The apparatus is equipped with feeding means 67 for feeding a powder and a liquid to the processing space 47. The feeding means 67 comprise an introducing member 71 that penetrates through the wall part 9 into the processing space 47 and that comprises accordingly an outer end disposed outside the vessel 1 and an inner end disposed inside the vessel 1 and inside the processing space 47. The introducing member 71 is also shown in larger scales in the FIGS. 2, 3 and 4. The wall part 9 is provided with a sleeve 75 shown in FIG. 2. The introducing member 71 is penetrating this sleeve 75, detachably fastened thereto by fastening means and sealed gas-tightly. The introducing member 71 is elongate, has a straight axis 73 and is in general rotationally symmetric to the latter. The axis 73 forms an angle with the vertical axis 3 of the vessel 1 and rotor 21 and is namely horizontal. As one can see in FIG. 2, the axis 73 of the introducing member 71 is—in a vertical view—skew with regard to the axis 3, i.e. does not cross the latter. The axis 73 forms in a vertical view an angle with a circle 92 that is concentric to the axis 3 and crosses the axis 73 at the end of the introducing member 71 inside the vessel. This angle is at most 60°, preferably at most 45° and for instance about 30°. There may be noted that the portion of the introducing member 71 that is outside the vessel 1 has been drawn in FIG. 1 for the sake of clarity in a simplified manner and as if it would be radial to the axis 3 of the vessel 1 and of the rotor 21.

The axis 73 is preferably at most 25% and for instance at most 15% of the diameter of the disc 23 above the supporting surface 23a if the rotor 21 is in its lowest possible position and/or in the position used for the layering operation. The diameter of the disc may for instance lie in the range of 20 cm to 200 cm. The height of the rotor 21 may for instance be variable in a range of 1 cm to 2 cm. The portion of the introducing member being inside the vessel 1 may have a radius that lies in the range of 1 cm to 3 cm and is for instance about 2 cm. The axis 73 may then be at most 10 cm, preferably at most 6 cm and for instance about 3 cm to 5 cm above the supporting surface 23a if the rotor is in its lowest possible position and/or in its position used in the layering operation. The axis 73 is also preferably at most 30%, better at most 20% and—if possible—even at most 10% of the diameter of the disc 23 above the supporting surface 23a if the rotor is in one of the previously specified positions.

The introducing member 71 comprises an inner and/or liquid nozzle 79 for introducing and atomizing liquid and an outer and/or powder nozzle 81 for introducing and atomizing powder. The introducing member comprises three elongate sleeves 83, 85, 87 encompassing each other, namely an inner sleeve 83, an intermediate sleeve 85 and an outer sleeve 87, wherein the three sleeves are coaxial to the axis 73 and in general rotationally symmetric to the latter. The inner sleeve 83 consists of a generally cylindrical tube 91 and of an outlet member 93 disposed inside the processing space 47. The outlet member 93 comprises a connecting portion connected by a threaded joint with the tube 91, a conically tapering portion and a thin cylindrical, hollow end portion 93a. The intermediate sleeve 85 comprises a generally cylindrically tube 95 and an outlet member 97, wherein the the tube 95 and the outlet member 97 are connected by a threaded joint. The ends of the three sleeves 83, 85, 87 at the right side of FIG. 4 are inside the vessel 1, i.e. inside the processing space 47. The introducing member 71 comprises at its end located on the left side of the FIGS. 3 and 4 and outside the vessel a connection member 101 with a throughgoing axial hole. The ends of the tubes 91 and 95 opposed to the outlet members 93 and 97, respectively, protrude into said hole of the connection member 101 and are detachably fastened to the latter by means of threaded joints and also sealed in a leakproof manner. The connection member 101 is provided with sections forming two threaded muffs serving a liquid inlet 101a and a gas inlet 101b of the liquid nozzle 79. The end of the axial hole of the connection member 101 facing away from the sleeves 83, 85, 87 is closed by a closing member 103 detachably fastened by a threaded joint. A pin 105 disposed coaxial to the axis 73 in the interior space of the inner sleeve 83 is attached to the closing member 103 and extends from the latter almost to the other end of the inner sleeve 83. The liquid inlet 101a has a hole opening into the interior space of the inner sleeve 83. This interior space serves as liquid passage 107 that has—from left to right in FIG. 4—a cylindrical major portion, a conically tapering portion and an inner and/or liquid outlet 107a formed by a thin hole inside the end portion 93a of the outlet member 93 and having a mouth opening into the processing space 47. The hole serving as inner and/or liquid outlet 107a has a full circular cross-section and is namely formed by a cylindrical bore. The gas inlet 101b has a hole opening into a hollow space disposed between the inner sleeve 83 and the intermediate sleeve 85. This hollow space forms a gas passage 109 that is annular in cross-section and comprises—from left to right in FIG. 4—a generally cylindrical major portion, a conically tapering portion and an intermediate and/or gas outlet 109a with an annular mouth opening into the processing space 47.

The outer sleeve 87 consists of a unique piece that has a cylindrical exterior surface extending over the entire length of the outer sleeve 87. The interior surface of the outer sleeve 81 comprises at the end of the sleeve disposed outside the vessel 1 and end portion fitting on the intermediate sleeve 85 and fastened detachably or undetachably and in a manner at least tight enough for avoiding leaks of powder and for example gasproof. The remaining major portion of the interior surface of the outer sleeve 81 is also cylindrical but wider than the end portion, so that there remains an annular hollow space between the intermediate sleeve 85 and said major portion of the interior surface of the outer sleeve 87. This hollow space forms a powder passage 111 with a mouth in the form of a circular annular opening into the processing space 47 and serving as outer and/or powder outlet 111a. The outlet member 97 belonging to the intermediate sleeve 85 protrudes out of the outer sleeve 87 and of the powder outlet 111a. The outlet member 107a belonging to the inner sleeve 83 protrudes out of the intermediate sleeve 85 and out of the gas outlet 109a and, thus, of course also out of the powder outlet 111a. It is pointed out that all three outlets 107a, 109a, 111a are rotationally symmetric and coaxial to the axis 73 so that the latter forms in particular also a common axis of said outlets. Accordingly, the centers of the mouths of the outlets 107a, 109a, 111a lie on the axis 73 and are, thus, in the height range previously specified for the axis 73 above the supporting surface 23a. Furthermore, the outer and/or powder outlet 111a encompasses the inner and/or liquid outlet 107a and the intermediate and/or gas outlet 109a in a view parallel to the axis 73 of the introducing member 71.

A powder inlet 113 that can be seen particularly well in FIG. 3 is disposed outside the vessel 1 and comprises a funnel 113a tapering downward and—at the lower end of the funnel—a cylindrical connection 113b protruding into the passage 111 and fastened to the outer sleeve 87 by means of a ring 115 encompassing the outer sleeve 87. Another ring 117 is disposed on the end of the outer sleeve 87 being outside the vessel. The powder nozzle 81 may moreover comprise a gas inlet 119 that penetrates the ring 117 as well as the outer sleeve 87 and opens into the powder passage 111 between the powder inlet 113 and that end of the powder passage that is closed and disposed outside the vessel 1. The introducing member 71 is moreover provided with a ground connection 121 connecting the generally metallic introducing member 71 electrically with ground.

The feeding means 67 comprise a liquid reservoir 127 containing a liquid 129 and connected by means of a liquid conduit 131 and a valve 133 with the liquid inlet 101a of the introducing member 71. The feeding means comprise also a gas source 137 with a pump 139 for compressing air and a gas reservoir 141 which is connected by gas conduits 143, 147 and valves 145, 149 with the gas inlets 101b and 119, respectively.

The feeding means 67 comprise moreover a powder reservoir 155 containing powder 157. A powder conveying device 161 comprises an elongate housing 161 with a horizontal sleeve closed at one end by an end wall and open at the other end. The housing 161 defines a horizontal conveying passage 165 with circular cross-section. The powder reservoir 155 is connected at its lower end by a connection with the conveying device 161. Said connection may possibly be provided with a shut-off-member not shown in the drawings and opens near the closed end of the sleeve into the conveying passage 165. The powder conveying device 161 is provided with a conveying member 167 that is supported rotatably around a horizontal axis and can be rotated by means of a drive device 169 with an electric motor. The conveying member 167 comprises a major part in the form of a hollow helix disposed inside the conveying passage 165. The inner diameter of the hollow helix is for example at least 50% of the outer diameter of the hollow helix. The drive device 169 is preferably adapted to enable that the number of revolutions of the conveying member 167 can be adjusted and may comprise for this purpose a motor with electrically variable speed or a transmission unit with stepless adjustable gear ratio.

The mouth of the open end of the housing 163 is disposed above the upper, open end of the funnel 113a. A cap-shaped, gas-permeable cover 173 is mounted on the upper end of the funnel 113a and covers the opening of the funnel 113a. The cover 173 covers and/or envelopes also a portion of the housing 163 comprising the open end of the latter. The cover 171 comprises a cage 173 fastened to the funnel 113a and a filter 177 held by the cage 175. The filter 177 is adapted to avoid that dust enters from the surroundings into the funnel and that powder supplied by the powder conveying device 161 and may be formed by a sieve that has for instance a mesh width of about 0.02 mm. The gas inlet 101b and 119 or the conduits connected to these inlets may by the way also be provided with a not shown filter for retaining dust.

The apparatus is moreover equipped with means for introducing core particles to be provided with a powder layer into the processing space 47 and for taking out the produced pellets. These means may be formed in one of conventional known manners, depending on the size and type of the apparatus. The vessel 1 may for instance have a separable wall portion that can be separated together with the rotor 21 from the remaining portions of the vessel. The apparatus may then comprise also a lowering/lifting device for temporarily lowering the conical wall part 5 and possibly also the lowest portion of the wall part 9. In place of a lowering/lifting device or in addition to such a device, one may also provide the wall of the vessel with an inlet aperture and/or an outlet aperture that can be closed and opened, wherein the possible provided outlet aperture may be disposed about at the height of the supporting surface 23a of the disc 23.

There may also be provided sensors for measuring the temperature and/or the pressure of the gas passed through the vessel and/or for measuring the temperature and/or possibly the humidity of the particles being inside the processing space. The wall of the vessel may also be provided with a translucent window enabling a visual inspection of the processing space 47.

The apparatus comprises also a control device 181 with manually operable operating members and electronic and/or pneumatic and/or hydraulic elements/or components. The control device is connected by electric and/or pneumatic and/or hydraulic conduits indicated schematically by arrows with the motors, actuators of the valves, sensors and the like. The control device 181 is preferably adapted to enable a manual or an automatic control of the process alternatively.

There will be described now a method for producing pellets by layering powder onto particles by means of the apparatus described previously.

It is assumed that the rotor 21 is at the beginning not rotating and in its lowest position so that the disc 23 rests on the seat 7a. One may bring now a batch of particles 191—or more precisely core particles—into the processing space 47 onto the supporting surface 23a of the rotor 21 so that the particles form a bed on the supporting surface. One batch comprises so many core particles that the inner end portion of the introducing member 71 will protrude into said bed and will be buried by the core particles during the layering process performed after the introduction of the batch of core particles as it can be seen in FIG. 1.

For starting the layering operation, the rotor 21 is slightly lifted so that a small annular gap is formed between the seat 7a and the disc 23. Furthermore, gas—i.e. air—is sucked by means of the sucking device 59 in an upward direction through the vessel 1 and in particular through said gap and through the processing space 47. The flow rate of this air is adjusted in such a way that the air avoids that particles fall through the gap. The air stream may moreover loosen and possibly lift the particles 191 lying in the edge portion of the disc a little bit, but should not fluidize the particles. The air passed through the processing space may have ambient room temperature—i.e. a temperature of about 20° C. to 25° C.—or may be slightly heated by means of the heating device 57 to a temperature of about 30° C. to 40° C. During the layering operation, the rotor 21 is rotated in the rotational direction indicated by the arrow 193 in FIG. 2, wherein the rotational speed lies—depending on the diameter of the disc 23—typically in the range of 200 to 1000 revolutions per minute. The rotation of the rotor 21 and the centrifugal force resulting therefrom causes the particles in the lower portion of the bed formed by the particles to move outward—i.e. away from the axis 3—along more or less spiral-shaped paths. The particles moving outward are retained by the wall of the vessel 1 so that the height of the bed formed by the particles increases away from the axis. The particles in the upper portion of the bed move then under the influence of gravity toward the axis 3.

As the rotor 21 is rotated in the direction of the arrow 193, a portion of the disc 23 momentarily disposed below the outlets 107a, 109a, 111a of the introducing member 71 has a velocity or—more precisely—tangential velocity with a component that is parallel to the axis 73 of the introducing member 71 and directed from the outer end to the inner end of the introducing member and from the latter into the free processing space. The particles 191 carried by the disc 23 pass the inner end portion of the introducing member 71 with a velocity that is more or less similar to the mentioned tangential velocity of the disc 23. As the velocity of the particles passing the inner end portion of the introducing is relatively high, a more or less distinct cavity may form in the region comprising the outlets 107a, 109a, 111a. Moreover, the particles 191 passing the inner end of the introducing member may possibly cause a sucking effect at the outlets of the introducing member.

The powder reservoir may for instance have been filled before the layering process with the amount of powder that is intended to be applied to the batch of core particles. During the layering operation, liquid 129 and powder 157 are continuously introduced into the processing space 47 through the introducing member 71. A liquid jet 197 and a powder jet 199 are thereby formed as it will be explained now more in detail. The liquid 129 is flowing from the liquid reservoir 127 to the introducing member 71 and atomized by means of pressurized air supplied from the gas source 141. The flow rates of liquid and air can be adjusted by means of the valves 133 and 145. The powder conveying device 161 conveys powder 157 from the powder reservoir 155 to the funnel 113a of the powder inlet 113. The fact that the conveying member 167 is hollow helps to avoid that the powder is forming clusters while it is conveyed by the conveying member. The conveying rate of powder can be set on a desired value by adjusting the drive device 169. The powder supplied by the powder conveying device 161 falls then through the inlet 113 into the powder passage 111 of the introducing member 71. As the sucking device 59 sucks air through the vessel 1, the pressure in the processing space 47 is somewhat less than the atmospheric pressure in the surroundings of the vessel. Accordingly, air from the surroundings is sucked through the gas-permeable cover 173, the inlet 113 and the powder passage 111 into the processing space 47. If one disconnects the gas conduit 147 from the gas inlet 119 and leaves the latter open, additional air is sucked through the gas inlet 119 into the powder passage 111 and through this passage into the processing space 47.

It was found that the previously mentioned sucking effect produced by the particles passing the introducing member and particularly the air sucked through the powder passage 111 by the sucking device 59 may be sufficient for sucking the powder entering the powder passage through the latter one and for atomizing the powder leaving the powder outlet 111*a* if the pressure inside the processing space is at least by a certain minimum value of for instance 1 kPa below the atmospheric air pressure. If desired or necessary and if the gas conduit 147 is connected with the gas inlet 119, one can in addition supply pressurized air through the gas inlet 119 for supporting the transport of powder through the powder passage 111 and the atomization of the powder. It may be mentioned that it has been found that pressurized air supplied through the gas inlet 119 supports the transport and atomization of powder in spite of the fact the cover 173 is gas-permeable.

The two jets 197, 199 are substantially coaxial to the axis 73. At least in the plane defined by the edge of the end portion 93*a* limiting the liquid outlet 107*a*, the powder jet 199 encompasses the liquid jet 197. Further downstream, the two jets may then probably merge in part. Liquid droplets and fine powder particles are sprayed in any case so close to each other that particles 191 carried by the rotor 21 and passing near the liquid outlet 107*a*, gas outlet 109*a* and powder outlet 111*a* are likely to come in contact simultaneously with liquid and powder. The atomized powder adheres on the wetted particles and is thus, layered onto particles passing in proximity of the outlets of the introducing member 71. An individual particles will normally pass several times near the introducing member 71 during the layering operation so that powder can be layered at each passage of said particle onto the same. The powder layered onto a particle after the first passage thereof adheres then to previously layered powder. Accordingly, one may produce pellets with a core particle comprising with several powder layers bound to each other and merged to a uniform envelope.

As the jets of liquid and powder are more or less merging so that at least a large fraction of particles passing the introducing member comes in contact at the same passage and substantially simultaneously with liquid and powder, the particles are provided uniformly with powder and the amount of liquid needed for making the powder to adhere is low.

As the powder outlet 111*a* is—with regard to the flow directions of the liquid and powder—upstream of the liquid outlet 107*a*, the atomized liquid can practically not wet powder inside the powder outlet 111*a* and can, accordingly, cause no obturations of the powder outlet 111*a* by agglomerating powder.

As the inner end of the introducing member 71 is covered by particles or pellets during the layering process, there will at most a very little amount of powder be lifted to the filter 41 by the air streaming through the processing space. When the intended amount of powder has been introduced into the processing space, the powder conveying device 161 may be stopped. One may then continue to spray liquid for a while and shake the filter 41 so that any powder particles possibly hanging on the filter 41 fall down on the bed of pellets and are also layered onto the pellets. Evidently, the filter 41 may be shaken already during the layering operation from time to time if this appears desirable.

Continuing to move the pellets by rotating the rotor with or without spraying liquid onto the pellets after ending the feeding of powder for some time will moreover have a smoothing and rounding effect on the surfaces of the pellets.

Normally, liquid and powder are introduced into the processing space continuously—i.e. without interruptions—and for instance at constant feeding rates during the layering operation. However, the feeding rate of the liquid 129 supplied during the feeding of powder and possibly after the feeding of powder has been ended should be controlled and adjusted in such a way that the powder is at one hand well adhering onto the particles and that the particles or pellets do not agglomerate on the other hand. There are various possibilities for enabling such a control. For instance, a person may visually observe the particles through the mentioned translucent window for detecting if the particles tend to agglomerate. It is also possible to measure the temperature and/or humidity of the particles by the mentioned sensors. If the apparatus is equipped with the torque measuring device 37, the measured value of the torque and/or the change of this value with time will also give informations on the state of the particles so that these informations may be used for controlling the liquid supply. If it is detected for instance in one way or the other that the particles tend to agglomerate, the feeding rate of the liquid may be reduced or possibly even interrupted or ended.

If the powder is well soluble in the atomized liquid, the pellets formed by layering powder onto core particles may so to say crystallize and obtain enough strength for avoiding a desintegration of the formed pellets. If this is the case, a drying operation may be started immediately after the layering operation.

However, it is also possible to insert a film coating operation between the layering operation and the drying operation and to provide the pellets thereby by a film overcoating. Such an overcoating may serve to increase the mechanical stability of the pellets and/or to protect them and/or for influencing the delivery of the pharmaceutical effective substance after the administration of pellets serving as drugs. Such a film overcoating can be formed by spraying for instance a watery solution comprising a substance already mentioned as binding agent—such as hydroxypropylmethylcellulose or any other suitable film forming material onto the pellets. The film forming material may be sprayed onto the particles for instance by means of the introducing member 71. If this is to be done, the liquid inlet 101*a* of the introducing member 71 may be connected over a branch disposed in the liquid conduit 43 between the liquid inlet 101*a* and the valve 145 and over an additional valve with an additional reservoir containing the film forming material, wherein said branch, said additional valve and said additional reservoir are not shown in the drawings. The film forming material may then be atomized by pressurized air supplied from the gas source 137 to the gas inlet 101*b*. The powder passage 111 of the introducing member will not be used during the film coating operation.

However, it is also possible to provide an additional, separate nozzle for atomizing the film forming material in the processing space 47. Such an additional nozzle may be designed similarly as the inner and/or liquid nozzle 79 of the introducing member and may be mounted analogue to the introducing member 71 in such a manner that it protrudes into the bed of particles. It is self-understood that the possibly provided additional nozzle will be mounted at a place distant from the introducing member along the circumference of the vessel.

If the pellets are provided with a film by means of the liquid nozzle 79 or by means of an additional nozzle, the spray rate of the film forming material shall be adjusted to avoid agglomeration of the pellets and to avoid the generation of dust from the drying pellet surfaces. In many cases, only small amounts of film forming material need to be applied. The formed film overcoatings may for instance have thickness as low as 0.001 mm to 0.002 mm so that the overcoatings do not impede the drying of the pellets. However, thicker overcoatings may be provided if necessary.

There will be described now the drying operation that may take place immediately after the layering operation or after the possible film coating operation. For this drying operation, the annular gap between the seat 7a and the disc 23 is increased by lifting the rotor 21. Furthermore the rotational speed of the rotor may possible be lowered. Moreover, the valve 53 and/or 63 having been in an intermediate position during the layering process may be opened more. Possibly, the rotational speed of the sucking device 59 may even be increased. The flow rate of the air sucked through the vessel 1 may thereby increased so much that pellets having rolled and/or slided over the disc 23 to the edge thereof are whirled up and fluidized and fall afterwards again on the disc. The pellets are, thus, alternately moved over the disc and fluidized. The air sucked through the vessel may moreover be heated by means of the heating device 57. The pellets will then be dried in short time.

The temperature of the pellets and of the air supplied to the vessel may be measured during the drying operation by means of not shown, already previously mentioned temperature sensors. Drying may then for instance be finished if the temperature of the pellets approaches the temperature of the air supplied to the vessel 1. The produced pellets can then be taken out of the vessel in a way depending on the previously mentioned kind of means provided for this purpose. There is for instance the possibility to stop the rotor and to lower the disc 23 to its lowest position so that it comes to rest on the seat 7a and closes the vessel below the processing space. The air flow through the vessel 1 is then also ended by stopping the sucking device 59 and possibly closing the flow regulating members 53, 63. Moreover, the conical wall part 5 of the vessel 1 can be lowered with the aid of the mentioned lowering/lifting device so that a wall portion containing the pellets and the rotor 21 can be separated temporarily from the rest of the vessel for removing the pellets. In case that the wall of vessel is provided with an outlet aperture, the pellets can be removed by opening this aperture and by rotating the rotor so that the pellets are thrown out of the vessel by the centrifugal effect of the rotor. Any dust particles possibly hanging on the filter 41 may then for instance be shaken off and collected in a bag.

When the vessel has been emptied in on way or other, a new batch of core particles may be treated.

The described operating may be controlled by a person or—preferably after having determined favorable operating parameters for producing the desired kind of pellets—automatically.

The apparatus and the method for producing pellets by layering powder onto core pellets may be modified in various manners.

If the liquid sprayed onto the particles comprises an organic solvent, the apparatus may be provided with means for recuperating this solvent.

Furthermore, it is possible to pass nitrogen or any other gas through the vessel in place of air. The gas source 137 would then be adapted to supply the same gas in place of air. Furthermore, the gas-permeable cover might then be replaced by a gas-proof cover and/or may be provided with means for supplying the mentioned gas.

It is also possible to replace the introducing member 71 by an introducing member that has a liquid nozzle without gas passage and without gas outlet. Moreover, one might possibly provide an introducing member with an inner nozzle serving as powder nozzle and with an outer nozzle serving as liquid nozzle.

The annular mouth of the outer outlet of the introducing member might possibly be replaced by a plurality of mouths disposed along an annular belt or wreath encompassing the inner outlet and the intermediate outlet of the introducing member.

The axis of the introducing member may possibly be slanted against a horizontal plane, wherein the angle between said axis and said horizontal plane should then be at most 45° and for instance at most 30°.

It is also possible to provide an introducing member that has two portions forming an angle, for instance an approximately right angle. One of the two portions may then penetrate the wall of the vessel substantially radially to the axis of the vessel. The other portion may then form the outlets opening having mouths into the processing space and define an axis for the outlets that is more or less tangential to the portion of the rotor disposed below the outlets.

The feeding means might possibly be provided with more than one introducing member. The various introducing members might then be disposed at places distributed along the circumference of the vessel.

It is also possible to perform alternately layering and drying operations of the described kinds.

Moreover, one may perhaps layer two or more different kinds of powder one after the other onto particles. These different kinds of powder may for instance be chemically different or—if they consist of blends—have different compositions.

The wall of the vessel and the rotor may perhaps be formed in such a way that the rotor can be rotated in position in which there is no or at least practically no gap between the wall of the vessel and the disc of the rotor. In this case, the layering operation may then be performed without passing gas in an upward direction between the wall of the vessel and the rotor.

What is claimed is:

1. Apparatus for producing pellets by layering powder onto particles, comprising a vessel, a rotor having a supporting surface for supporting particles, arranged in said vessel and supported for rotation around a vertical rotational axis, feeding means for introducing a powder and a liquid into a processing space disposed inside said vessel and adjacent to said supporting surface of said rotor, wherein said feeding means comprise an introducing member, a liquid outlet and a powder outlet, wherein said outlets open into said processing space and have a common axis, and wherein one of said outlets encompasses the other of said outlets in a view parallel to said axis of said outlets.

2. Apparatus as claimed in claim 1, wherein each of said outlets has a mouth that is rotationally symmetric to said axis of said outlets and wherein the mouth of the powder outlet is annular and encompasses the mouth of the liquid outlet in said view parallel to the axis of said outlets.

3. Apparatus as claimed in claim 2, wherein said introducing member comprises a gas outlet with an annular mouth disposed between the mouths of said liquid outlet and said powder outlet in said view parallel to the axis of the outlets and adapted to produce a gas stream for atomizing said liquid.

4. Apparatus as claimed in claim 2, wherein the introducing member comprises a member limiting the liquid outlet and protruding out of the powder outlet.

5. Apparatus as claimed in claim 1, wherein said axis of said outlets forms an angle with said rotational axis.

6. Apparatus as claimed in claim 1, wherein said axis of said outlets is one of horizontal and slanted against a horizontal plane at an angle being at most 45°.

7. Apparatus as claimed in claim 6, wherein said axis of said outlets is skew in a vertical view with regard to said rotational axis.

8. Apparatus as claimed in claim 7, wherein a drive device is provided and operatively connected for rotation with said rotor and serving for rotating said rotor in one direction, and wherein said introducing member is adapted to produce a liquid jet and a powder jet ejected out of said liquid outlet and said powder outlet, respectively, in a direction selected from forming an acute angle with the direction of movement of a portion of said rotor disposed below said outlets and parallel to said direction of movement.

9. Apparatus as claimed in claim 1, wherein the centers of the mouths of said outlets are at most 6 centimeters above said supporting surface of said rotor at least while the rotor is in the position intended for the layering of powder.

10. Apparatus as claimed in claim 1, wherein said introducing member comprises a powder inlet and a powder passage extending from this powder inlet to said powder outlet, wherein said feeding means comprise a powder reservoir, a conveying device adapted for conveying powder from the powder reservoir to said powder inlet of said introducing member and wherein there are provided means for producing a gas stream from said powder inlet through said powder passage to said powder outlet serving for transporting powder from the powder inlet to and through the powder outlet.

11. Apparatus as claimed in claim 10, wherein said vessel has a wall portion encompassing said rotor, wherein an annular gap is provided between said wall portion and said rotor, wherein a sucking device is provided for sucking air in an upward direction through said annular gap and through said processing space and for producing thereby a pressure in the latter being by a pressure difference below the ambient pressure in the surroundings of the vessel and wherein said powder inlet is adapted to enable said pressure difference to cause air from the surroundings of the vessel to enter through said powder inlet into said powder passage and to produce at least a part said gas stream through said powder passage.

12. Apparatus as claimed in claim 10, wherein said conveying device comprises a housing defining a substantially horizontal conveying passage and a conveying member with a hollow helix.

13. Method for producing pellets by layering powder onto particles, comprising introducing particles into a processing space of a vessel, the processing space being limited at its lower end by a rotor rotatable around a vertical axis, rotating said rotor so that a bed of moving particles is formed on said rotor, and introducing atomized liquid and powder into said bed by feeding means having a liquid outlet and powder outlet protruding into said bed.

14. Method as claimed in claim 13, wherein the liquid and the powder are introduced into the processing space as jets, with jet axes that are one of horizontal and slanted against a horizontal plane at an angle being at most 45°.

15. Method as claimed in claim 14, wherein said jets have a direction selected from forming an acute angle with the direction of movement of a portion of said rotor disposed below said jets and parallel to said direction of movement.

16. Method as claimed in claim 13, wherein the liquid and the powder are introduced as jets having a common jet axis.

17. Method as claimed in claim 13, wherein the powder is atomized by means of gas passed to and through said powder outlet.

18. Method as claimed in claim 17, wherein said vessel has a wall portion encompassing said rotor, wherein an annular gap is provided between said wall portion and said rotor, wherein air is sucked out of said vessel so as to draw air upwardly through said annular gap and said processing space, wherein said feeding means define a passage connected with the atmosphere in the surroundings of the vessel and extending into the powder outlet, wherein said air sucked out of said vessel draws air from the surroundings of the vessel into said passage and through said powder outlet, and wherein the last mentioned air forms at least in part said gas serving to atomize said powder.

* * * * *

UNITED STATES PATENT AND TRADEMARK OFFICE
CERTIFICATE OF CORRECTION

PATENT NO. : 5,132,142

DATED : July 21, 1992

INVENTOR(S) : David M. JONES et al.

It is certified that error appears in the above-identified patent and that said Letters Patent is hereby corrected as shown below:

On the title page:
In the title, item 54, the word "POWER" should be -- POWDER --.

Signed and Sealed this

Second Day of November, 1993

Attest:

Attesting Officer

BRUCE LEHMAN

Commissioner of Patents and Trademarks